(12) United States Patent
Matsubara et al.

(10) Patent No.: US 11,906,822 B2
(45) Date of Patent: Feb. 20, 2024

(54) INFORMATION PROCESSING DEVICE (71) Applicant: TOYOTA JIDOSHA KABUSHIKI KAISHA, Toyota (JP)

(72) Inventors: Tomoya Matsubara, Seto (JP); Ibuki Shimada, Miyoshi (JP); Keisuke Shoji, Nagoya (JP); Shuhei Yamamoto, Aichi-ken (JP); Hideo Hasegawa, Nagoya (JP); Yurika Tanaka, Yokosuka (JP); Satoshi Komamine, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 17/468,134

(22) Filed: Sep. 7, 2021

(65) Prior Publication Data
US 2022/0082873 A1    Mar. 17, 2022

(30) Foreign Application Priority Data

Sep. 17, 2020   (JP) ................................ 2020-156672

(51) Int. Cl.
*G02F 1/01* (2006.01)
*E06B 9/24* (2006.01)

(52) U.S. Cl.
CPC .............. *G02F 1/0121* (2013.01); *E06B 9/24* (2013.01); *E06B 2009/2405* (2013.01); *E06B 2009/2464* (2013.01); *G02F 2203/48* (2013.01)

(58) Field of Classification Search
CPC ...... G02F 1/0121; G02F 2203/48; G02F 1/01; E06B 9/24; E06B 2009/2405; E06B 2009/2464
See application file for complete search history.

(56) References Cited

U.S. PATENT DOCUMENTS

| 2012/0307341 | A1* | 12/2012 | Higuchi | ............. G02F 1/15165 |
| | | | | 359/275 |
| 2015/0002768 | A1* | 1/2015 | Wu | .......................... E06B 9/24 |
| | | | | 359/290 |
| 2015/0156031 | A1* | 6/2015 | Fadell | .................. G08B 27/003 |
| | | | | 700/90 |

(Continued)

FOREIGN PATENT DOCUMENTS

| CN | 106029415 A | 10/2016 |
| CN | 206233809 U | 6/2017 |

(Continued)

*Primary Examiner* — Mariam Qureshi
(74) *Attorney, Agent, or Firm* — Sughrue Mion, PLLC (57) ABSTRACT

An information processing device includes a controller configured to acquire a detected value of a sensor that detects presence or absence of a person within a predetermined range outside one or more openings that is formed in a wall surface of a first building, each of the one or more openings using light control glass, the wall surface facing outside, and control transmittance of the light control glass based on the detected value of the sensor. A building includes one or more opening that is formed in at least a wall surface that faces outside, the opening using light control glass; a sensor that detects presence or absence of a person within a predetermined range outside the one or more openings; and a control device that controls transmittance of the light control glass based on a detected value of the sensor.

5 Claims, 7 Drawing Sheets

(56) References Cited

U.S. PATENT DOCUMENTS

| | | | |
|---|---|---|---|
| 2016/0318379 A1 | 11/2016 | Okuda et al. | |
| 2020/0108700 A1* | 4/2020 | Flanigan | B60J 3/04 |
| 2020/0332591 A1* | 10/2020 | Dierenbach | G09F 19/22 |
| 2021/0112647 A1* | 4/2021 | Coleman | H05B 45/12 |
| 2022/0057761 A1* | 2/2022 | Watanabe | E06B 3/6722 |

FOREIGN PATENT DOCUMENTS

| | | |
|---|---|---|
| JP | 2011-132672 A | 7/2011 |
| JP | 2012-52339 A | 3/2012 |

* cited by examiner

GLASS INFORMATION TABLE

| GLASS ID | POSITION | SENSOR ID | TRANSPARENCY STATE |
|---|---|---|---|
| G001 | | | TRANSPARENT |
| G002 | | | OPAQUE |

INFORMATION PROCESSING DEVICE

CROSS REFERENCE TO THE RELATED APPLICATION

This application claims the benefit of Japanese Patent Application No. 2020-156672, filed on Sep. 17, 2020, which is hereby incorporated by reference herein in its entirety.

BACKGROUND

Technical Field

The present disclosure relates to an information processing device, a building, and a method.

Description of the Related Art

There is disclosed a house that has a function of protecting privacy, the house being such that a main opening of a room of the building faces a courtyard that is present on an inner side of the building and that has an open top, a window in an outer wall portion has a width that is too narrow for a person to pass through, and an outer wall is integrated with an outer fence (for example, Patent Document 1).

CITATION LIST

Patent Document

[Patent Document 1] Japanese Patent Laid-Open No. 2011-132672

An aspect of the present disclosure is aimed at providing an information processing device, a building, and a method that prevent inside of the building from being seen from outside the building.

SUMMARY

One aspect of the present disclosure is an information processing device comprising a controller configured to:
acquire a detected value of a sensor that detects presence or absence of a person within a predetermined range outside one or more openings that is formed in a wall surface of a first building, each of the one or more openings using light control glass and the wall surface facing outside, and
control transmittance of the light control glass based on the detected value of the sensor.
Another aspect of the present disclosure is a building comprising:
one or more openings that is formed in a wall surface that faces outside, each of the one or more openings using light control glass;
a sensor that detects presence or absence of a person within a predetermined range outside the one or more openings; and
a control device that controls transmittance of the light control glass based on a detected value of the sensor.
Another aspect of the present disclosure is a method comprising:
acquiring a detected value of a sensor that detects presence or absence of a person within a predetermined range outside one or more openings that are formed in a wall surface of a first building, each of the one or more openings using light control glass, the wall surface facing outside, and
controlling transmittance of the light control glass based on the detected value of the sensor.
According to the present disclosure, inside of a building may be prevented from being seen from outside the building.

DESCRIPTION OF THE EMBODIMENTS

An aspect of the present disclosure is an information processing device including a controller configured to acquire a detected value of a sensor that detects presence or absence of a person within a predetermined range outside one or more openings that is formed in a wall surface of a first building, the opening using light control glass, the wall surface facing outside, and control transmittance of the light control glass based on the detected value of the sensor.

The light control glass is, for example, glass for which the amount of light to be transmitted may be adjusted by an external signal such as electricity. For example, transmittance of the light control glass is controlled by application of voltage to cause a change in density (degree of transparency) and/or color tone, and the light control glass may thus be placed in a transparent, semi-transparent or opaque state. Transparency, semi-transparency or opacity of the light control glass may thus be controlled. In the present specification, the light control glass may alternatively be glass having a light control film disposed on a surface.

The first building is a house, an apartment building, a building, a store or the like, for example. The first building may be one apartment in an apartment building, for example. The opening of the first building is a window, a doorway, an entrance or the like, for example.

The sensor is a camera, a human sensor or the like, for example. Additionally, a person to be detected by the sensor is a pedestrian, a person riding a bicycle, a person who is pausing, or the like, for example. Moreover, the sensor may also detect, in addition to people, moving bodies of predetermined dimensions or greater, such as vehicles and motorcycles, for example.

The information processing device is a control device, a smart speaker, and home security equipment installed inside the first building, a PC, and a server on a network, for example. A case where presence of a person within a predetermined range outside the opening of the first building is detected is a case where a person is passing by in front of the first building, for example.

According to an aspect of the present disclosure, in a case where a person is present within the predetermined range outside the opening of the first building, transmittance of the light control glass used in the opening is controlled. This makes the inside of the first building not easily seen from the outside through the opening, and security and privacy inside the first building may be protected.

According to an aspect of the present disclosure, in a case where presence of a person within the predetermined range outside is detected for at least a first opening among one or more openings, the controller may control the transmittance of first light control glass used in the first opening such that the first light control glass is placed in the semi-transparent or opaque state. This makes the inside of the first building not easily seen from the outside through the first opening.

According to an aspect of the present disclosure, in a case where presence of a person within the predetermined range outside the first opening is not detected in a state where the first light control glass is controlled to be in the semi-transparent or opaque state, the controller may control the transmittance of the first light control glass such that the first light control glass becomes transparent. Accordingly, in a case where a person is not present on a periphery of the first opening, the first light control glass used in the first opening is placed in the transparent state, and a state where view from inside the first building is spoilt may be prevented from continuing, and also, reduction in the amount of light coming in and reduction in a liberated feeling may be prevented, for example.

According to an aspect of the present disclosure, even in a case where presence of a person within the predetermined range outside is detected for the first opening, if a first condition is satisfied, the controller may control the transmittance of the first light control glass used in the first opening such that the first light control glass is placed in the transparent state. The first condition may be one or a combination among the following cases: a case where a person other than a person who is associated with the first building is not detected within the predetermined range outside the first opening, a case where outside is brighter than inside of the first building, and a case where a curtain that is hung at the first opening is closed. The first condition is a condition used to indicate an environment in which the inside of the first building is allowed to be seen from the outside or in which the inside of the first building is not easily seen from the outside. That is, in a case where the necessity to make the inside of the first building not easily seen is small, the light control glass used in the first opening remains in the transparent state even if a person approaches the first opening. Accordingly, a duration of a state where view from inside the first building is spoilt, a period of time when the amount of light coming in is reduced, and a period of time when a liberated feeling is reduced, that are caused by an approaching person, may be reduced.

According to an aspect of the present disclosure, each of the one or more openings may include a plurality of sections and may include light control glass in each of the plurality of sections. In this case, if presence of a person within the predetermined range outside is detected for the first opening, the controller may specify, as the first light control glass, light control glass that is used in a section, among the plurality of sections included in the first opening, that is provided at and around a height of an eye level of the person. Accordingly, even in a case where there is a person within the predetermined range outside the first opening, the light control glass in the section at the height of eyes of the person, among the plurality of sections of the first opening, is placed in the semi-transparent or opaque state, but light control glass in other sections is maintained in the transparent state. Therefore, spoiling of the view from inside the first building, reduction in the amount of light coming in, and reduction in the liberated feeling that are caused by presence of a person within the predetermined range outside the opening may be better prevented.

Additionally, another aspect of the present disclosure may be specified as a building including an opening where the above-described light control glass is used, the above-described sensor, and a control device corresponding to the above-described information processing device. The building is a house, an apartment building, a building, a store, or one apartment in an apartment building. Additionally, the information processing device according to an aspect of the present disclosure may also be provided on a wall of an apartment in an apartment building that faces a shared space or an indoor wall of a room that faces a shared space.

In the following, an embodiment of the present disclosure will be described with reference to the drawings. The configuration of the embodiment described below is an example, and the present disclosure is not limited to the configuration of the embodiment.

First Embodiment

Figure 1:
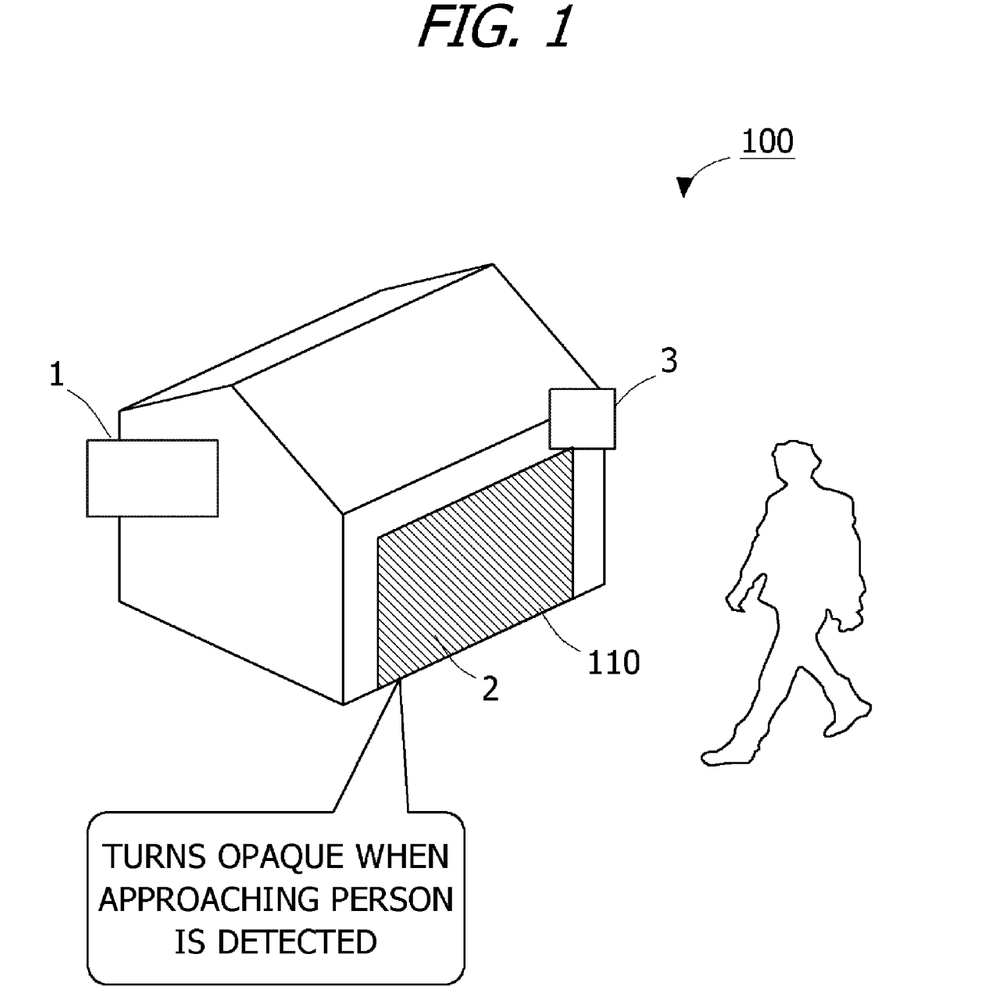
FIG. 1 is a diagram illustrating an example of a house according to a first embodiment.

FIG. 1 is a diagram illustrating an example of a house 100 according to a first embodiment. The house 100 has at least a window 110 facing a place where people pass by which adopt and using light control glass 2, and controls transmittance of the light control glass according to presence or absence of a person within a predetermined range outside the window 110. The house 100 is an example of "first building". The window 110 is an example of "opening".

The light control glass 2 is used in a window installed in an outer wall, and in a window in a door installed in an outer wall, for example. Furthermore, the light control glass 2 may be used in a window and a window in a door that are installed in an outer wall, among outer walls, that faces a place where an unspecified large number of people are expected to pass by, such as a pavement, a road, a park, or a parking lot. The window where the light control glass 2 is used is an example of "opening that is formed in a wall surface of a first building, the opening using light control glass, the wall surface facing outside".

For example, the amount of light that is transmitted through the light control glass 2 is adjusted by application of voltage. In the first embodiment, for example, transmittance of the light control glass 2 is controlled based on a value of voltage that is applied, and density (degree of transparency) and/or color tone are/is thus changed. When voltage is applied, the light control glass 2 is placed in one of semi-transparent and opaque states. An initial state of the light control glass 2 is a state where voltage is not applied, and the light control glass 2 is assumed to be in a transparent state in the state where voltage is not applied. When application of voltage to the light control glass 2 is stopped, the light control glass 2 is placed the transparent state, and the semi-transparent or opaque state is canceled.

In the first embodiment, the more increased the transmittance, the lower the degree of transparency of the light control glass 2 becomes, or in other words, the more opaque the light control glass 2 becomes. Furthermore, in the first embodiment, when voltage is applied, the transmittance is increased to be equal to or greater than a predetermined value, and the opaque state is reached. That is, in the first embodiment, the light control glass 2 is assumed to be capable of shifting between two states of the transparent state and the opaque state. Additionally, the light control glass 2 may be glass having a light control sheet disposed on a surface, in which case the amount of light that is transmitted through the light control sheet is adjusted by application of voltage. Alternatively, the light control glass 2 may be a screen on which an image from a projector may be projected when in the opaque state, or may include a liquid crystal film and be used as a display that displays an image.

The house 100 includes a control device 1 and a sensor 3. The sensor 3 is a sensor that is capable of detecting presence of a person within the predetermined range, for example. A sensor that is capable of detecting presence of a person within the predetermined range includes a camera, a human sensor, a radar or the like. However, the sensor is not limited to those listed above. The sensor 3 is installed on a periphery of the window 110 where the light control glass 2 is used, on a same wall as the window 110, or on a periphery outside the window 110. More specifically, the sensor 3 is installed such that a detection range of the sensor 3 includes a place where people pass by outside the window 110. For example, in the case where the sensor 3 is a camera, the detection range is a capturing range, and a detected value is a captured image. For example, in the case where the sensor 3 is a human sensor, a detected value is information indicating whether or not there is a person within the detection range.

When a detected value is input from the sensor 3, the control device 1 specifies the light control glass 2 as the control target based on the detected value, and controls a transparency state of the specified light control glass 2. For example, the light control glass 2 as the control target is the light control glass 2 that is used in the window 110 corresponding to the sensor 3 that acquired the detected value. The transparency state of the light control glass 2 may include a transparent, semi-transparent and opaque state, for example. A state in which the light control glass 2 is transparent is a state in which one side of the light control glass 2 can be clearly seen from the other side through the light control glass 2. A state in which the light control glass 2 is semi-transparent is a state in which one side of the light control glass 2 can be seen from the other side through the light control glass 2, but not clearly. A state in which the light control glass 2 is opaque is a state in which one side of the light control glass 2 cannot be seen from the other side through the light control glass 2. The semi-transparent and opaque states of the light control glass 2 are controlled based on the transmittance of the light control glass 2, for example. Additionally, in relation to the semi-transparent state of the light control glass 2, a plurality of levels may be set according to the transmittance of the light control glass 2. Additionally, in the first embodiment, in relation to the transparency state, the light control glass 2 is assumed to be shifted between two states of the transparent state and the opaque state.

In the first embodiment, in a case where a person is present within the predetermined range outside the window 110, the light control glass 2 is placed in the opaque state. The inside of the house is thus not easily seen from the outside, and privacy may be protected and security may be increased.

Figure 2:
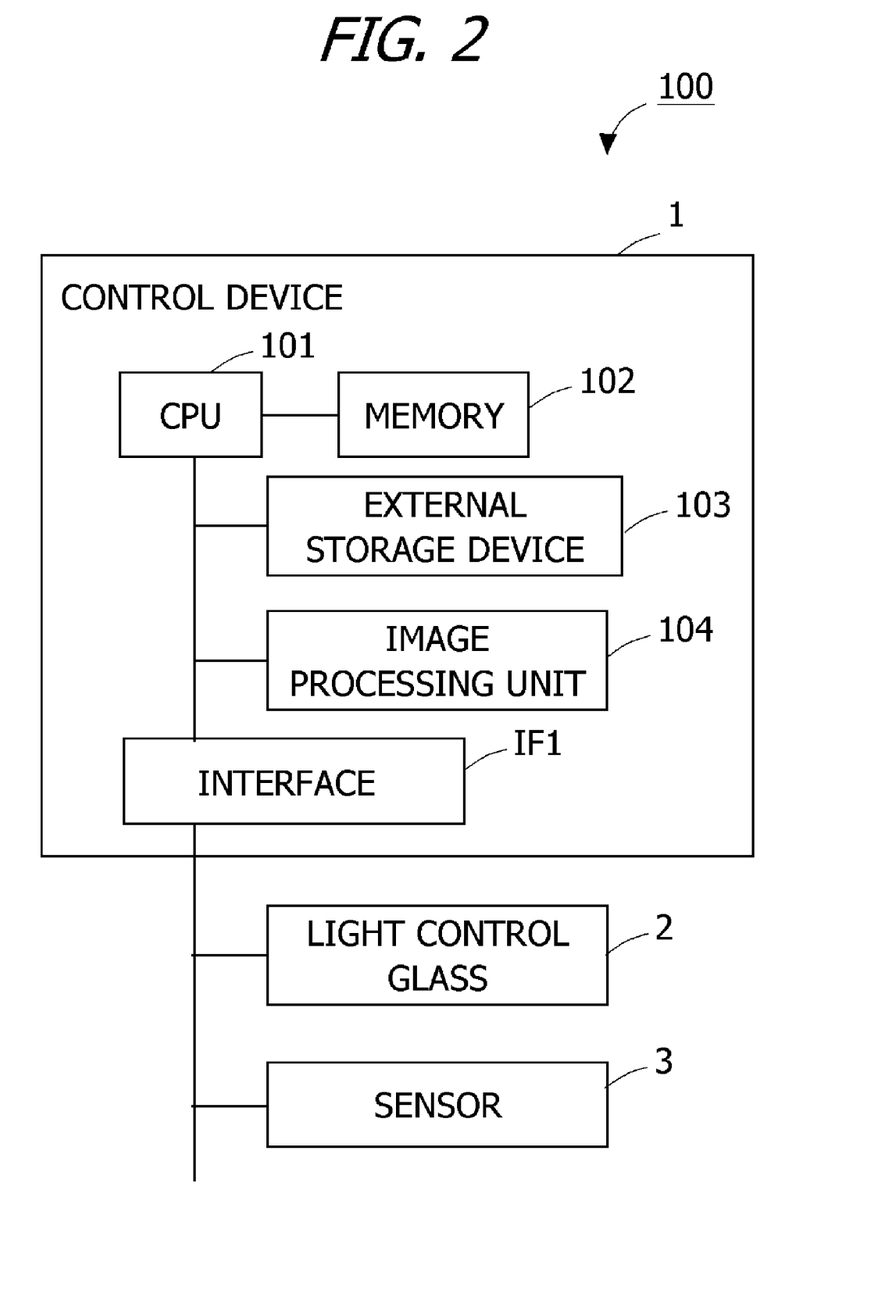
FIG. 2 is a diagram illustrating an example of a hardware configuration of the control device.

FIG. 2 is a diagram illustrating an example of a hardware configuration of the control device 1. For example, the control device 1 is a computer, home security equipment, a smart speaker, or a personal computer (PC) that is installed inside the house 100 and that performs control in relation to the house 100. The control device 1 includes a CPU 101, a memory 102, an external storage device 103, an image processing unit 104, and an interface IF1. The interface IF1 is connected to the light control glass 2 and the sensor 3. Additionally, the interface for connecting the light control glass 2 and the interface for connecting the sensor 3 may be separate interfaces.

The CPU 101 executes a computer program that is loaded into the memory 102 to be executable, and performs processing as the control device 1. The memory 102 stores computer programs to be executed by the CPU 101, data to be processed by the CPU 101, and the like. For example, the memory 102 is a dynamic random access memory (DRAM), a static random access memory (SRAM), a read only memory (ROM) or the like. The external storage device 103 is a non-volatile memory, and is a solid state drive (SSD), a hard disk drive or the like. The image processing unit 104 coordinates with the CPU 101, and in a case where a camera is used as an example of the sensor 3, the image processing unit 104 processes a captured image that is obtained from the camera every predetermined frame period. The image processing unit 104 includes a GPU and an image memory as a frame buffer, for example.

Additionally, the hardware configuration of the control device 1 is not limited to the configuration illustrated in FIG. 2, and can be changed as appropriate according to the embodiment. The control device 1 is an example of "information processing device" or of "control device". The CPU 101 is an example of "controller".

There may be provided a plurality of sheets of light control glass 2 and a plurality of sensors 3. The sensor 3 is a camera, a human sensor, a radar or the like. A camera to be used as the sensor 3 is a capturing device that uses an image sensor such as a charged-coupled device (CCD), a metal-oxide-semiconductor (MOS), a complementary metal-oxide-semiconductor (CMOS) or the like. The camera to be used as the sensor 3 acquires an image every predetermined period of time referred to as a frame period, and outputs the image to the control device 1. In a case where the camera is used as the sensor 3, the camera is installed such that the predetermined range outside the window 110 is included in the capturing range. Additionally, a plurality of cameras with different capturing directions may be installed for one window 110. In a case where there is the window 110 in each of a plurality of different outer walls of the house 100, the sensor 3 is installed for each window 110.

FIG. 2 illustrates the interface IF1 as an example, but exchange of signals between the control device 1 and a control target is not limited to be performed through the interface IF1. That is, the control device 1 may include a plurality of signal exchange paths other than the interface IF1. Furthermore, in FIG. 2, the control device 1 includes a single CPU 101. However, the CPU is not limited to a single processor and may have a multiprocessor configuration. Alternatively, a single CPU connected by a single socket may have a multicore configuration. At least a part of processes of each unit described above may be performed by a processor other than the CPU, such as a dedicated processor such as a digital signal processor (DSP) or a graphics processing unit (GPU). At least a part of processes of each unit described above may be an integrated circuit (IC) or another digital circuit. An analog circuit may be included in at least a part of the units described above.

Figure 3:
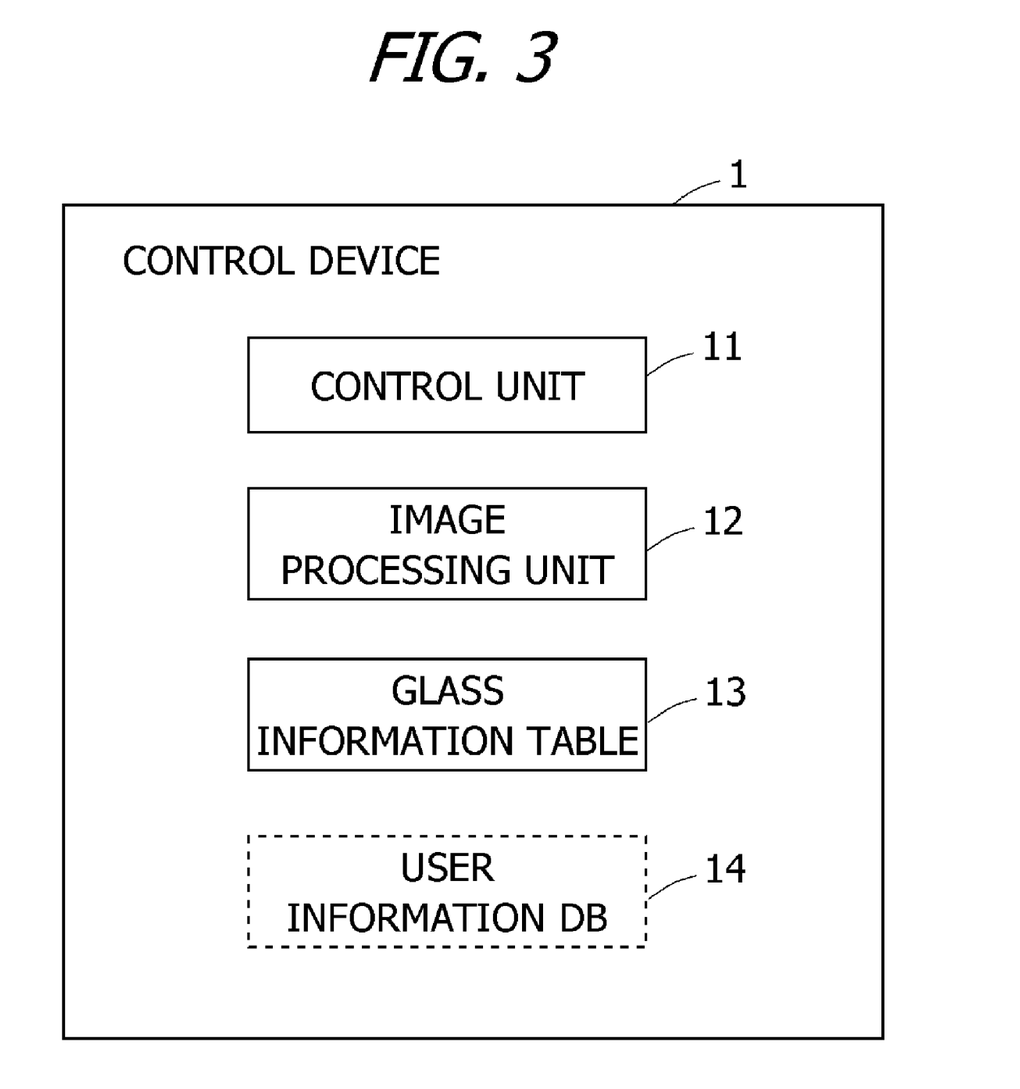
FIG. 3 is a diagram illustrating an example of a functional configuration of the control device.

FIG. 3 is a diagram illustrating an example of a functional configuration of the control device 1. As functional elements, the control device 1 includes a control unit 11, an image processing unit 12, and a glass information table 13. These functional elements are implemented by the CPU 101 of the control device 1 executing predetermined programs stored in the external storage device 103, for example. Additionally, FIG. 3 also illustrates a user information DB 14 as a functional element, but the user information DB 14 is not used in the first embodiment. A description of the user information DB 14 will be given in a second embodiment.

The control unit 11 receives input of a detected value from the sensor 3. When a detected value is input from the sensor 3, the control unit 11 determines whether or not there is a person within the predetermined range outside the window 110. Furthermore, the control unit 11 specifies the light control glass 2 as a control target depending on whether there is a person within the predetermined range outside the window 110. The light control glass 2 as a control target is the light control glass 2 that is used in the window 110 corresponding to the sensor 3 detecting presence of a person within the predetermined range outside the window 110, or the light control glass 2 that is used in the window 110 corresponding to the sensor 3 detecting absence of a person within the predetermined range outside the window 110, for example.

For example, in a case where an opacity condition is satisfied, the control unit 11 specifies, as the control target, the light control glass 2 corresponding to the window 110 for which presence of a person within the predetermined range outside is determined, and places the light control glass 2 that is the control target in the opaque state. For example, in a case where an opacity cancellation condition is satisfied, the control unit 11 specifies, as the control target, the light control glass 2 that is in the opaque state, and places the light control glass 2 that is the control target in the transparent state. The opacity cancellation condition is a condition for returning the light control glass 2 from the opaque state to the transparent state.

The opacity condition is a condition for placing the light control glass in the opaque state. The opacity condition is that there is a person within the predetermined range outside the window 110, for example. The opacity cancellation condition is a condition that there is no person within the predetermined range outside the window 110, for example. The opacity cancellation condition may alternatively be that absence of a person within the predetermined range outside the window 110 is continuously detected for a predetermined period of time.

For example, in a case where the sensor 3 is a camera, the control unit 11 detects presence of a person within the predetermined range outside the window 110, when a person is detected as a result of image processing performed by the image processing unit 12 on a captured image from the camera. For example, in a case where the sensor 3 is a camera, the control unit 11 detects absence of a person within the predetermined range outside the window 110, when a person is not detected as a result of image processing performed by the image processing unit 12 on a captured image from the camera.

For example, in a case where the sensor 3 is a human sensor or a radar, presence of a person within the predetermined range outside the window 110 is detected when a detected value indicates presence of a person within a detection range. For example, in a case where the sensor 3 is a human sensor or a radar, absence of a person within the predetermined range outside the window 110 is detected when a detected value indicates absence of a person within a detection range.

In the case of controlling the transparency state of the light control glass 2, the control unit 11 controls the transmittance of the light control glass 2, for example. The transmittance of the light control glass 2 may be increased by applying voltage to the light control glass 2, for example. The light control glass 2 reaches the opaque state when the transmittance of the light control glass 2 reaches or exceeds a first transmittance threshold, for example. In a case where the opacity condition is satisfied, the control unit 11 applies voltage at a predetermined level to the light control glass 2 that is the control target such that the transmittance of the light control glass 2 that is the control target reaches or exceeds the first transmittance threshold.

For example, the light control glass 2 is placed in the transparent state when application of voltage to the light control glass 2 is stopped or when the transmittance of the light control glass falls to or below a second transmittance threshold. The second transmittance threshold is a value that is equal to or smaller than the first transmittance threshold. In a case where the opacity cancellation condition is satisfied, the control unit 11 stops application of voltage to the light control glass 2 that is the control target or reduces the transmittance to or below the second transmittance threshold.

The image processing unit 12 performs image analysis according to an instruction from the control unit 11. The image processing unit 12 is a functional element corresponding to the image processing unit 104. An image analysis result from the image processing unit 12 is output to the control unit 11. Presence of a person within the capturing range and/or an identification result of a detected person are/is acquired from the image analysis result from the image processing unit 12, for example. However, information to be acquired from the image analysis result is not limited to those mentioned above.

Figure 4:
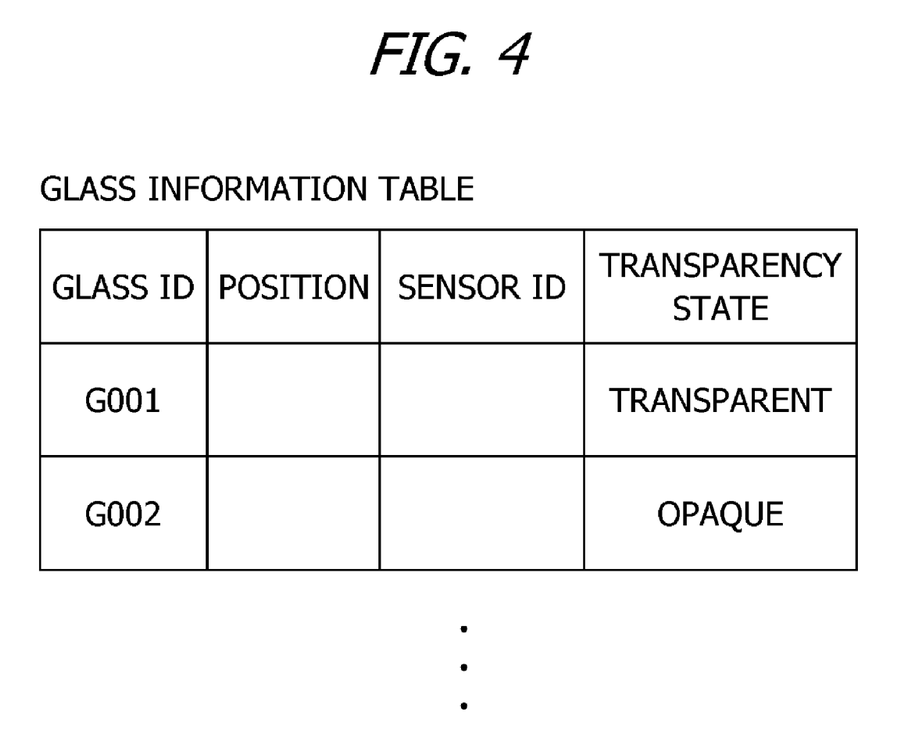
FIG. 4 is an example of the glass information table.

FIG. 4 is an example of the glass information table 13. The glass information table 13 holds information about the light control glass 2. The glass information table 13 is stored in a storage area of the external storage device 103, for example.

The glass information table 13 includes the following fields: glass ID, position, sensor ID, and transparency state. Identification information on the light control glass 2 provided in each window 110 is stored in the field "glass ID". Information indicating a position where the light control glass 2 is provided is stored in the field "position". Information indicating the position where the light control glass 2 is provided may be identification information on the window 110 where the light control glass 2 is used, or may be information indicating the position of the window 110 on the house 100, for example. Alternatively, information indicating the position where the light control glass 2 is provided may be coordinates on a coordinate system inside the house 100.

Identification information on the sensor 3 that is associated with the light control glass 2 is stored in the field "sensor ID". Information indicating the transparency state of the light control glass 2 is stored in the field "transparency state". Information indicating the transparency state of the light control glass 2 is "transparent" or "opaque", for example, and may be indicated by a flag or the like. Additionally, information for indicating the transparency state of the light control glass 2 is not limited to those mentioned above, and may alternatively be the transmittance that is currently set, for example.

Additionally, the functional configuration of the control device 1 illustrated in FIG. 3 and the structure of the glass information table 13 illustrated in FIG. 4 are merely examples and not restrictive.

<Flow of Processes>

Figure 5:
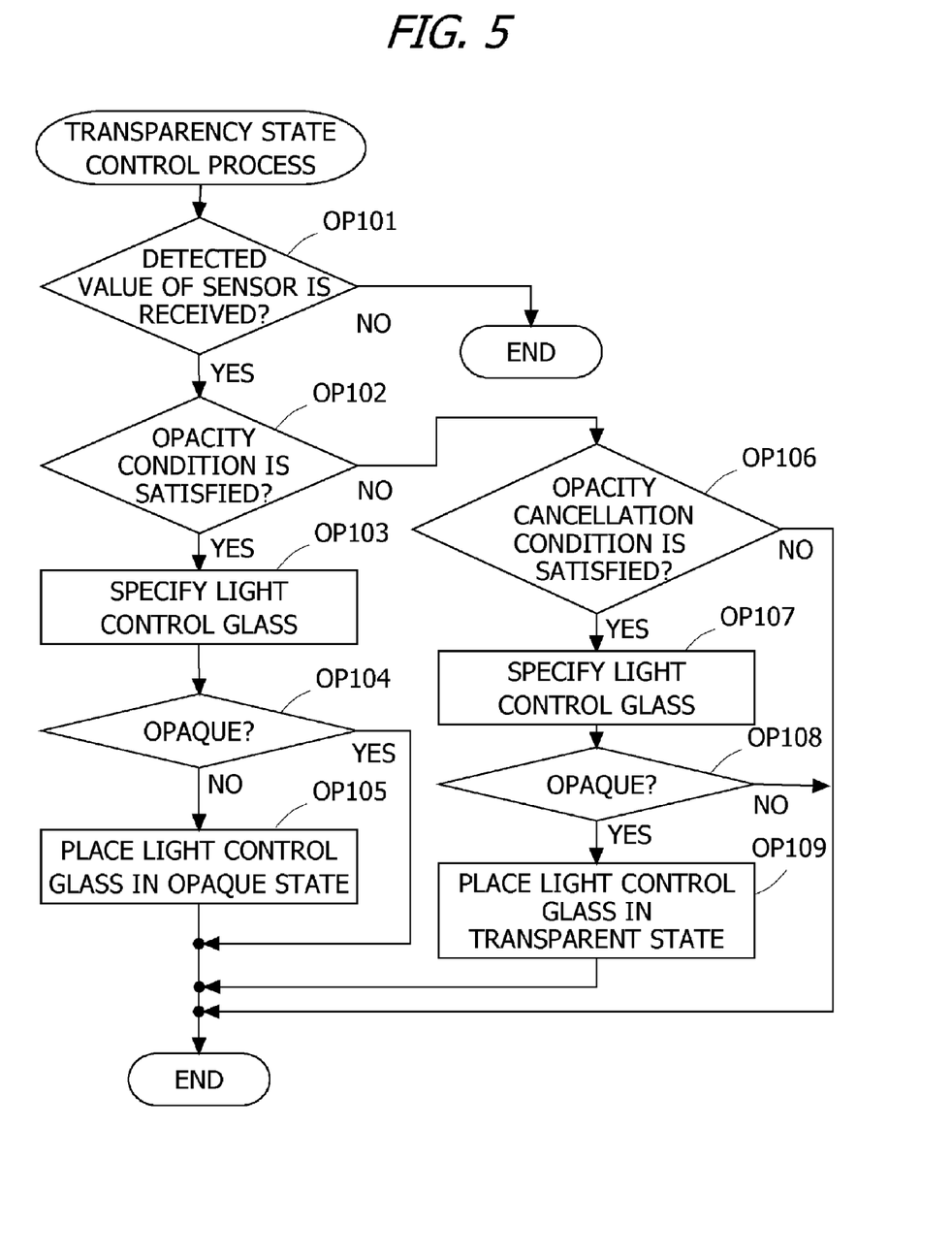
FIG. 5 is an example of a flowchart of a control process performed by the control device on the transparency state of the light control glass.

FIG. 5 is an example of a flowchart of a control process performed by the control device 1 on the transparency state of the light control glass 2. The process illustrated in FIG. 5 is repeated every predetermined period of time during operation of the control device 1. Alternatively, the process illustrated in FIG. 5 is repeatedly performed during operation of the control device 1, while control of the transparency state of the light control glass 2 by the control device 1 is validated by a user operation. The main performer of the processes illustrated in FIG. 5 is the CPU 101, but a description will be given taking a functional element as the performer for the sake of convenience.

In OP101, the control unit 11 determines whether or not a detected value of the sensor 3 is received. In the case where a detected value of the sensor 3 is received (OP101: YES), the process proceeds to OP102. In the case where a detected value of the sensor 3 is not received (OP101: NO), the process illustrated in FIG. 5 is ended.

In OP102, the control unit 11 determines whether or not the opacity condition is satisfied, based on the detected value of the sensor 3. In the case where the opacity condition is satisfied (OP102: YES), the process proceeds to OP103. In the case where the opacity condition is not satisfied (OP102: NO), the process proceeds to OP106.

In OP103, the control unit 11 specifies the light control glass 2 that is the control target. For example, the control unit 11 refers to the glass information table 13, and specifies the light control glass 2 corresponding to the sensor 3 satisfying the opacity condition as the control target.

In OP104, the control unit 11 determines whether or not the light control glass 2 that is the control target is in the opaque state, by referring to the glass information table 13. In the case where the light control glass 2 that is the control target is in the opaque state (OP104: YES), the transmittance of the light control glass 2 is not controlled so as to maintain the light control glass 2 that is the control target in the opaque state, and the process illustrated in FIG. 5 is ended. In the case where the light control glass 2 that is the control target is not in the opaque state (OP104: NO), the process proceeds to OP105.

In OP105, the control unit 11 applies, to the light control glass 2 that is the control target, voltage at a predetermined value with which the transmittance is increased to or above the first transmittance threshold, for example, so as to place the light control glass 2 that is the control target in the opaque state. The process illustrated in FIG. 5 is then ended.

In OP106, the control unit 11 determines whether or not the opacity cancellation condition is satisfied, based on the detected value of the sensor 3. In the case where the opacity cancellation condition is satisfied (OP106: YES), the process proceeds to OP107. In the case where the opacity cancellation condition is not satisfied (OP106: NO), the process illustrated in FIG. 5 is ended.

In OP107, the control unit 11 specifies the light control glass 2 that is the control target. For example, the control unit 11 refers to the glass information table 13, and specifies the light control glass 2 corresponding to the sensor 3 satisfying the opacity cancellation condition as the control target.

In OP108, the control unit 11 refers to the glass information table 13, and determines whether or not the light control glass 2 that is the control target is in the opaque state. In the case where the light control glass 2 that is the control target is in the opaque state (OP108: YES), the process proceeds to OP109. In the case where the light control glass 2 that is the control target is in the transparent state (OP108: NO), the transmittance is not controlled so that the light control glass 2 that is the control target is maintained in the transparent state, and the process illustrated in FIG. 5 is ended.

In OP109, the control unit 11 places the light control glass 2 that is the control target in the transparent state. For example, the control unit 11 stops application of voltage to the light control glass 2 that is the control target, or controls a value of the voltage to be applied such that the transmittance of the light control glass 2 that is the control target falls to or below the second transmittance threshold. The process illustrated in FIG. 5 is then ended.

Additionally, the control process of the transparency state of the light control glass 2 by the control device 1 is not limited to the process illustrated in FIG. 5.

Operation and Effects of First Embodiment

In the first embodiment, for example, when a person approaches a window 110, the light control glass 2 used in the window 110 is placed in the opaque state. Accordingly, the inside of the house 100 is not easily seen through the window 110 by a person who is, for example, walking outside the window 110, and privacy may be protected and security may be increased for the house 100.

Furthermore, for example, when the person has passed the front of the window 110 and there is no person within the predetermined range outside the window 110, the light control glass 2 used in the window 110 is returned to the transparent state. Accordingly, for example, a duration of a period of time when view from inside the house 100 is blocked and light is prevented from entering the house 100 due to the light control glass 2 being opaque may be prevented from becoming long.

Second Embodiment

Figure 6:
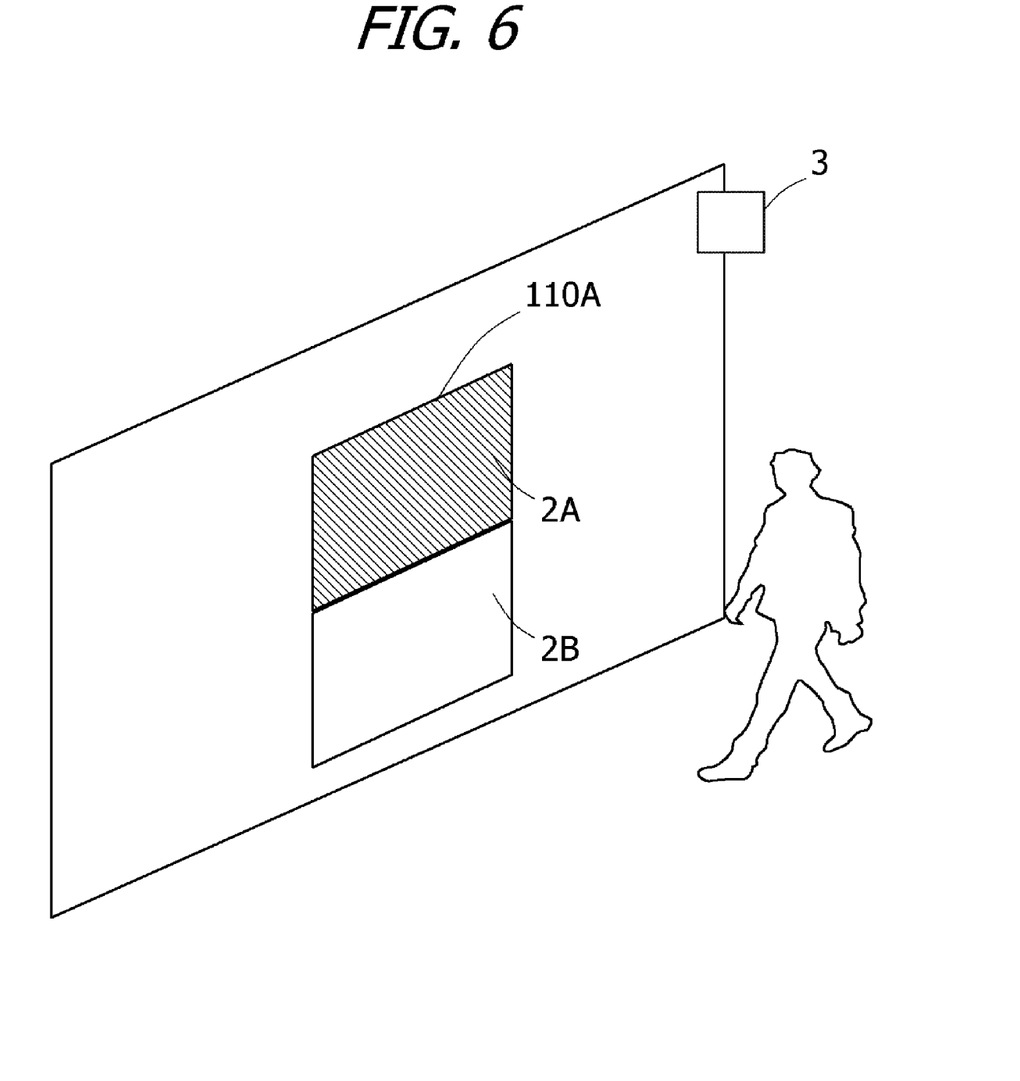
FIG. 6 is a diagram illustrating an example of a window according to a second embodiment.

FIG. 6 is a diagram illustrating an example of a window 110A according to a second embodiment. In the second embodiment, one window 110A is divided into a plurality of sections, and one sheet of light control glass 2 is used in each section. In FIG. 6, the window 110A is equally and horizontally divided into two sections, and the window 110 includes two sections. The window 110A uses light control glass 2A in the top section, and light control glass 2B in the bottom section.

In a case where presence of a person within the predetermined range outside the window 110A is detected by the sensor 3, the light control glass 2A that is used in the section of the window 110A at the height of the eye level of the person becomes opaque, and the light control glass 2B in the other section of the window 110A is maintained in the transparent state. Accordingly, because a part of the window 110A is maintained in the transparent state, the view from inside the house 100 and the amount of light coming in may be maintained at predetermined levels while blocking visibility of the inside of the house 100 from the person outside the window 110A.

Furthermore, in the second embodiment, an exclusion condition is provided according to which the light control glass 2 is not placed in the opaque state even when the opacity condition is satisfied. The exclusion condition is that a person other than a person associated with the house 100 is not detected within the predetermined range outside the window 110, that the outside is brighter than the inside of the house 100, or that a curtain that is hung at the window 110A is closed, for example. The exclusion condition is an example of "first condition".

For example, in the case where a person who is present within the predetermined range outside the window 110A is a resident of the house 100, and no other person is detected, there is no problem with the resident of the house 100 looking into the house 100 from outside. In the case where the outside is brighter than the inside of the house 100, the inside of the house 100 is not easily seen from the outside due to a difference in brightness. Furthermore, in the case where a curtain hung at the window 110A is closed, the inside of the house 100 is not visible from the outside. That is, in the second embodiment, in the case where the necessity to place the light control glass 2 in the opaque state is low, the corresponding light control glass 2 remains transparent even when there is a person within the predetermined range outside the window 110A. This prevents the light control glass 2 from being frequently placed in the opaque state.

A description of the second embodiment that is common with that of the first embodiment will be omitted. The hardware configuration in the second embodiment is the same as that in the first embodiment. As illustrated in FIG. 3, in the second embodiment, the control device 1 includes the control unit 11, the image processing unit 12, the glass information table 13, and the user information DB 14 as functional elements.

In the second embodiment, when the opacity condition is satisfied, the control unit 11 determines whether or not the exclusion condition is satisfied. The exclusion condition is that a person other than a person associated with the house 100 is not detected within the predetermined range outside the window 110, that the outside is brighter than the inside of the house 100, or that a curtain that is hung at the window 110A is closed, for example. In the case where the exclusion condition is satisfied, the control unit 11 places the target light control glass 2 in the transparent state.

That a person other than a person associated with the house 100 is not detected within the predetermined range outside the window 110 is a condition that is validated in a case where the sensor 3 is a camera, for example. That a person other than a person associated with the house 100 is not detected within the predetermined range outside the window 110 is acquired when persons detected from a captured image from the camera do not include persons other than users who are registered in the user information DB 14 described later, for example.

That the outside is brighter than the inside of the house 100 is determined based on a time slot and/or weather, on/off of a light of the house 100, or detected values of light sensors installed inside and outside the house 100, for example. The weather may be acquired online, for example. On/off of a light may be acquired by connecting the control device 1 to a switch of the light, or may be acquired from a device that manages the state of the light, for example. The control device 1 may be connected to or may be capable of communicating with the light sensors installed inside and outside the house 100, and may determine that the outside is brighter than the inside of the house 100, in a case where brightness of the outside is greater than brightness of the inside by a predetermined value or more, for example.

That a curtain that is hung at the window 110A is closed may be acquired by connecting the control device 1 and a sensor that detects an open/closed state of the curtain or from a device that manages the open/closed state of the curtain, for example.

In the second embodiment, the glass information table 13 also includes, as position information on the light control glass 2, identification information on a corresponding section of the window 110A. Specifically, identification information on the window 110A where the light control glass 2 is used and the identification information on the section are stored in a field "position" illustrated in FIG. 4. The identification information on the section may be information indicating a position, such as "top" or "bottom", for example.

The user information DB 14 is created in a predetermined storage area in the external storage device 103 of the control device 1. A facial image of a user who is associated with the house 100 is stored in the user information DB 14. A user who is associated with the house 100 may be a resident of the house 100, and a person who is permitted by the resident of the house 100, for example. A person who is permitted by the resident of the house 100 may be a relative, a friend or the like, for example.

Figure 7:
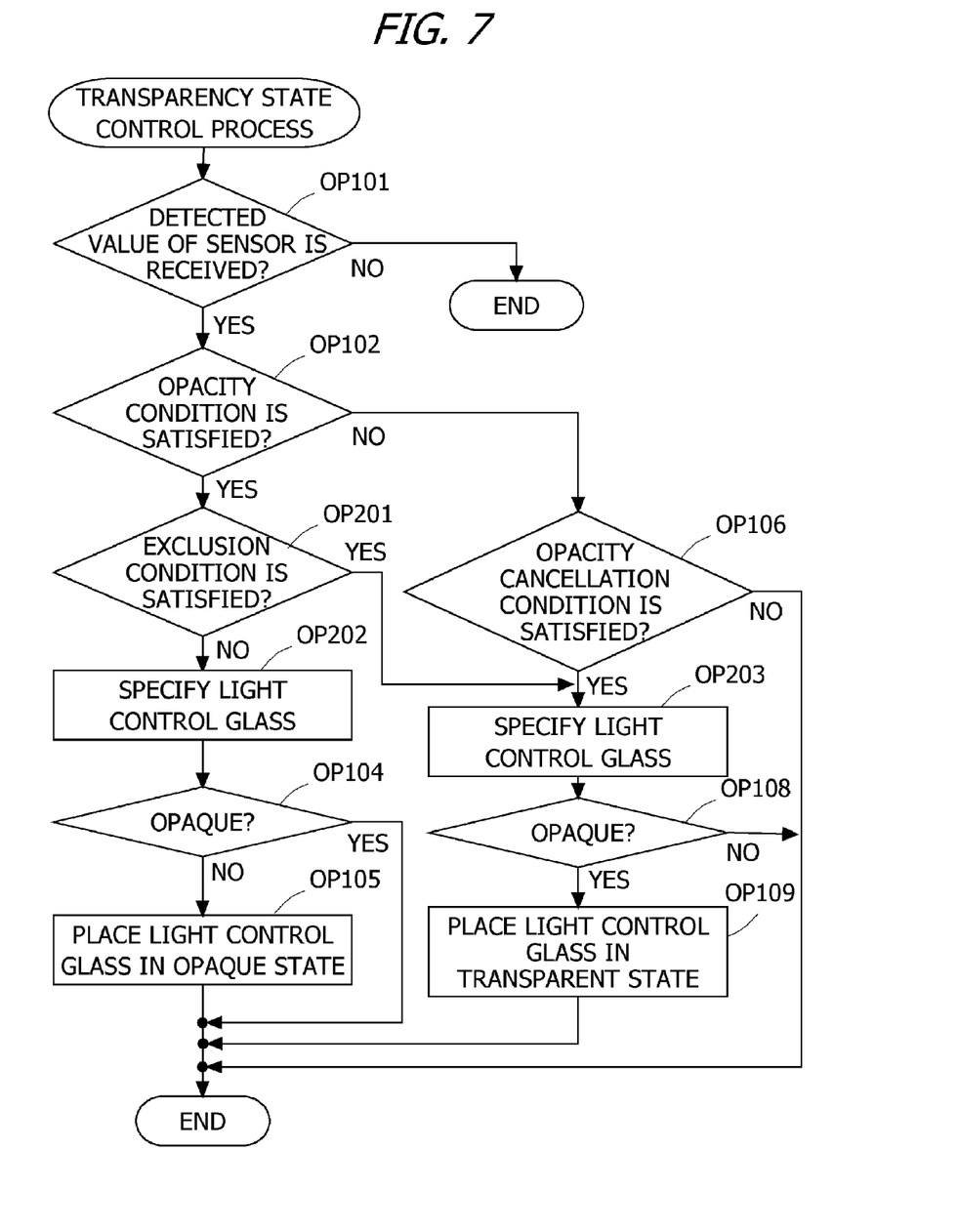
FIG. 7 is an example of a flowchart of a control process of the transparency state of the light control glass according to the second embodiment.

FIG. 7 is an example of a flowchart of a control process of the transparency state of the light control glass 2 according to the second embodiment. In FIG. 7, same processes as those of the flowchart, illustrated in FIG. 5, of the control process of the transparency state of the light control glass 2 according to the first embodiment are denoted by the same reference signs, and a description thereof is omitted.

In the second embodiment, in the case where the opacity condition is satisfied (OP102: YES), the process proceeds to OP201. In OP201, the control unit 11 determines whether or not the exclusion condition is satisfied. In the case where the exclusion condition is not satisfied (OP201: NO), the process proceeds to OP202, and the light control glass 2 that is the control target is specified in OP202, and the light control glass 2 that is the control target is placed in the opaque state (OP105).

In the case where the exclusion condition is satisfied (OP201: YES), the process proceeds to OP203, and the light control glass 2 that is the control target is specified in OP203, and the light control glass 2 that is the control target is controlled to be in the transparent state (OP109).

In OP202 and OP203, the control unit 11 specifies the window 110A for which the opaque condition or the opacity cancellation condition is satisfied, and further specifies the section of the window 110A that is to be controlled. For example, the height of the eye level of a person who is present outside the window 110A may be specified from a captured image from a camera as the sensor 3, and a corresponding section of the window 110A may be specified as the section of the window 110A to be controlled. Alternatively, a section of the window 110A that corresponds to the height of the eye level of a person may be set in advance, and this section may be specified. The control unit 11 refers to the glass information table 13, and specifies the light control glass 2 corresponding to the specified section as the control target.

According to the second embodiment, the light control glass 2 in a section, of the window 110A for which presence of a person outside is detected, corresponding to the height of the eye level of the person is made opaque, and other sections remain transparent. Accordingly, blocking of the view from inside the house 100 and a reduction amount of light entering the house 100 may be suppressed.

Furthermore, in the second embodiment, even in a case where a person is present outside, if a person other than a person who is associated with the house 100 is not detected, the light control glass 2 of the window 110 is controlled to be in the transparent state. Accordingly, the light control glass 2 may be made opaque in limited cases of high necessity. Moreover, the light control glass 2 may be prevented from being frequently placed in the opaque state.

Other Embodiments

The embodiment described above is an example, and the present disclosure may be changed and carried out as appropriate without departing from the gist of the present disclosure.

In the first and second embodiments, the transparency states of the light control glass 2 are two states of transparent and opaque, but such a case is not restrictive, and a plurality of levels corresponding to semi-transparency may be set between transparent and opaque according to the transmittance. For example, the control unit 11 may determine the level of the transparency state of the light control glass 2 based on the difference in brightness between the inside and outside of the house 100, the season, the time slot and the like.

Furthermore, in the first and second embodiments, the transparency state of the light control glass 2 is controlled by controlling the transmittance, but such a case is not restrictive. The transparency state of the light control glass 2 may be controlled by controlling the color tone, for example.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing device comprising a controller configured to:
    acquire a detected value of a sensor that detects presence or absence of a person within a predetermined range outside one or more openings that is formed in a wall surface of a first building, each of the one or more openings using light control glass and the wall surface facing outside;
    determine whether or not the presence of a person within the predetermined range outside is detected for at least a first opening among the one or more openings based on the detected value of the sensor;
    determine whether or not a first condition is satisfied in a case where the presence of a person within the predetermined range outside is detected;
    control transmittance of first light control glass used in the first opening such that the first light control glass is placed in a transparent state in a case where the first condition is satisfied; and
    control the transmittance of the first light control glass such that the first light control glass is placed in a semi-transparent or opaque state in a case where the first condition is not satisfied; and wherein
    the first condition is that outside of the first building is brighter than inside of the first building and
    the controller
    acquires brightness values detected by light sensors installed inside and outside of the first building and
    determines that the outside of the first building is brighter than the inside of the first building in a case where brightness value of the outside of the first building is greater than brightness value of the inside of the first building by a predetermined value or more.

2. The information processing device according to claim 1, wherein, in a case where presence of a person within the predetermined range outside the first opening is not detected, the controller is configured to control the transmittance of the first light control glass such that the first light control glass becomes transparent.

3. The information processing device according to claim 1, wherein the first condition is that a person other than a person who is associated with the first building is not detected within the predetermined range outside the first opening.

4. The information processing device according to claim 1, wherein the first condition is that a curtain that is hung at the first opening is closed.

5. The information processing device according to claim 1, wherein
    each of the one or more openings includes a plurality of sections and includes light control glass in each of the plurality of sections, and
    in a case where presence of a person within the predetermined range outside is detected for the first opening, the controller is configured to specify, as the first light control glass, light control glass that is used in a section, among the plurality of sections included in the first opening, that is at a height of an eye level of the person.

* * * * *